(12) United States Patent
Kamhi et al.

(10) Patent No.: US 8,949,639 B2
(45) Date of Patent: Feb. 3, 2015

(54) USER BEHAVIOR ADAPTIVE SENSING SCHEME FOR EFFICIENT POWER CONSUMPTION MANAGEMENT

(75) Inventors: Gila Kamhi, Zichron Yaakov (IL); Andrew Kuzma, Portland, OR (US); Nadav Orbach, Haifa, IL (US); Eli Turiel, Shimshit (IL)

(73) Assignee: Intel Corporation, Santa Clara, CA (US)

( * ) Notice: Subject to any disclaimer, the term of this patent is extended or adjusted under 35 U.S.C. 154(b) by 94 days.

(21) Appl. No.: 13/538,666

(22) Filed: Jun. 29, 2012

(65) Prior Publication Data
US 2014/0006830 A1    Jan. 2, 2014

(51) Int. Cl.
*G06F 1/32* (2006.01)
(52) U.S. Cl.
CPC ............ *G06F 1/3287* (2013.01); *G06F 1/3206* (2013.01); *G06F 1/3231* (2013.01)
USPC ............ 713/320; 713/300; 713/323; 713/324
(58) Field of Classification Search
CPC ............................ G06F 1/3287; G06F 1/3206
USPC .................................. 713/300, 320, 323, 324
See application file for complete search history.

(56) References Cited

U.S. PATENT DOCUMENTS

| | | | |
|---|---|---|---|
| 2009/0229892 A1* | 9/2009 | Fisher et al. | 178/18.03 |
| 2012/0105193 A1* | 5/2012 | Gritti | 340/3.4 |
| 2012/0147531 A1* | 6/2012 | Rabii | 361/679.01 |

* cited by examiner

*Primary Examiner* — Vincent Tran
(74) *Attorney, Agent, or Firm* — Kenyon & Kenyon LLP

(57) ABSTRACT

A deactivated passive user interaction sensor may be activated or deactivated on demand based on an expected use of the sensor. The expected use may be ascertained by detecting a predetermined user interaction at another sensor that is already active. Once the predetermined user interaction is detected, the active sensor may be deactivated and the sensor that is expected to be used may be activated. Total sensor power consumption may be reduced by providing a predetermined sensor activation and deactivation sequence for at least three sensors in a computing system based on predetermined user interactions with an active sensor. Methods, apparatuses, systems, and computer readable media are provided.

22 Claims, 5 Drawing Sheets

USER BEHAVIOR ADAPTIVE SENSING SCHEME FOR EFFICIENT POWER CONSUMPTION MANAGEMENT

BACKGROUND

Computing systems, such as smart phones, tablets, video game consoles, and desktop computers, are being equipped with different types of passive user interaction detection sensors that enable users to interact with these systems in more natural and intuitive ways. For example, a gesture recognition sensor may enable a user to turn a page by swiping their hands in the air instead of clicking on a scroll bar or button.

Many computing systems have included three or more different types of sensors for detecting different types of user interactions. For example, a computing system may include a proximity sensor to identify a user or object presence, a touch sensitive sensor to identify contact with a screen or other touch sensitive surface, a microphone to identify speech or sound, and a two and/or three dimension sensor to identify movements or gestures in more than one dimension.

As the number of active sensors increases, the aggregate power consumed by these sensors also increases. This may lead to unnecessarily shorter battery life and/or increased consumption of power, especially in those situations where the sensors are activated but then not used. Accordingly, there is a need for a power management arrangement capable of deactivating sensors when they are not being used and then reactivating on demand with minimal user impact.

DETAILED DESCRIPTION

Figure 1:
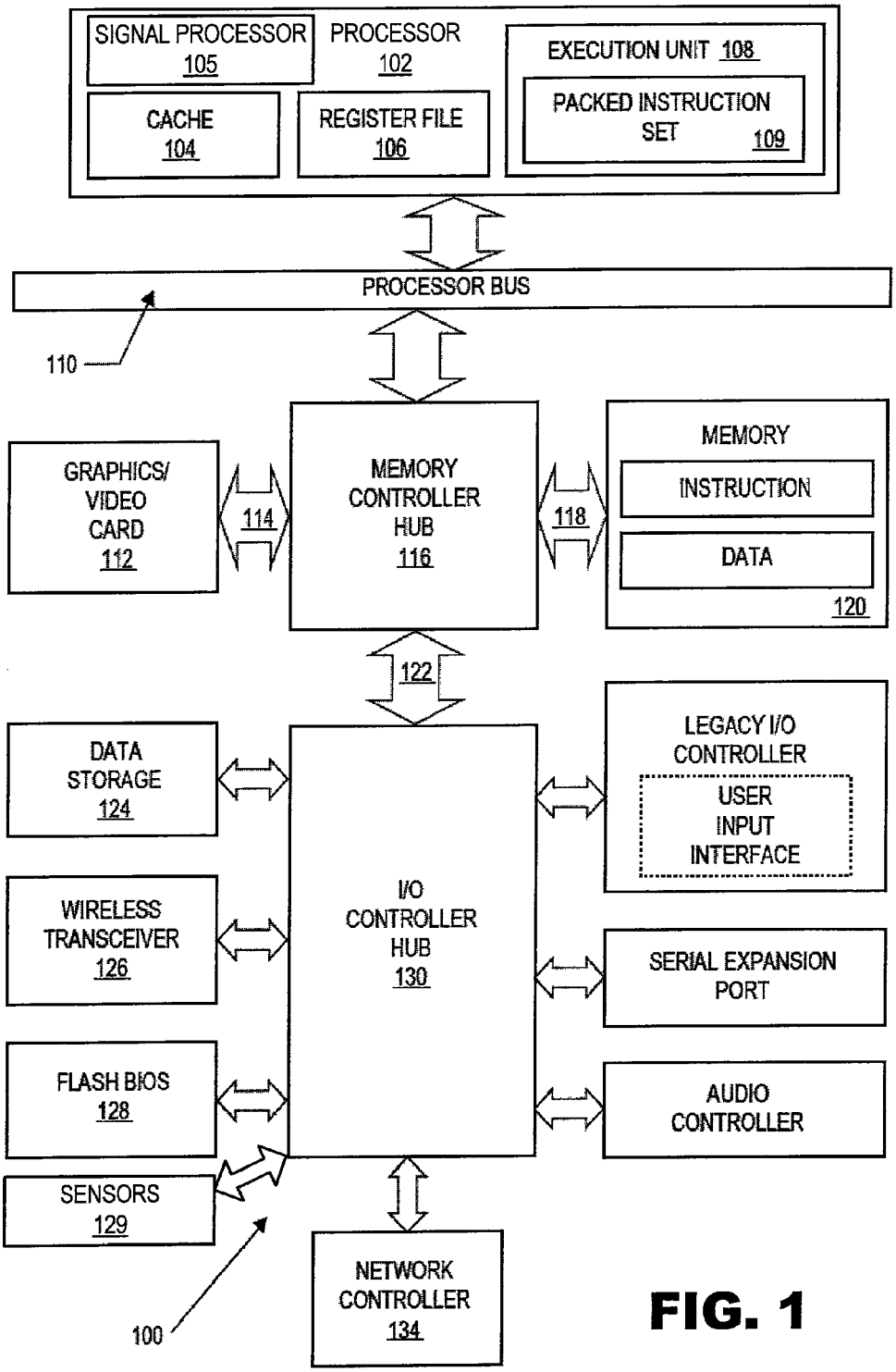
FIG. 1 shows a block diagram of an exemplary computer system in an embodiment of the invention.

In an embodiment of the invention having three or more passive user interface sensors, one or more of the sensors may be selectively activated or deactivated depending on an expected use of the sensor. A sensor may be expected to be used when a predetermined user interaction is detected at an active sensor. Once the predetermined user interaction is detected, the active sensor may be deactivated and the sensor that is expected to be used may be activated thereby changing a power mode of a sensor.

The configuration of different sensor power modes may be based on expected user behavior. Passive user interface sensors may be used to determine a user's intent to interact with a computing device by observing a user's behavior. This observing may occur by sensing or tracking a gesture, gaze, or other action of the user. This information may then be used to select a particular sequence for activating and deactivating sensors when configuring the different power modes.

For example, a touch-sensitive sensor may be expected to be used and may be activated when a proximity sensor detects a presence of an object, such as a hand of the user, in the vicinity of the touch sensor. Once the proximity sensor detects an object presence in the vicinity of the touch sensor, the touch sensor may be activated and the proximity sensor may be deactivated. If no contact is detected at the activated touch sensor within a predetermined time, the touch sensor may be deactivated and the proximity sensor may be reactivated. Since a proximity sensor generally consumes less power than a touch sensor, total power consumption may be reduced by deactivating the touch sensor when it is not being used. This is one example of how user behavior may be observed and used to configure different sensor power modes.

In another example, two dimensional sensor, such as a red green blue (RGB) color sensor adapted to track an object movement in two dimensions, may be used to detect a start of a particular hand movement. Once the start of the hand movement is detected at the RGB sensor, a three dimensional sensor, such as a near infrared sensor adapted to track an object movement in three dimensions, may be activated and the two dimensional sensor may be deactivated. The three dimensional sensor may be used to identify a particular hand gesture movement in three dimensions. Total power consumption may be reduced in this example by only activating the higher power consuming three dimensional sensor when it likely that the user is attempting a three dimensional gesture based on the hand movements detected at the lower power consuming two dimensional sensor.

In another example including a proximity sensor, a near infrared sensor, and a RGB color sensor, the proximity sensor may initially activate the near infrared sensor after detecting the presence of an object or hand. The near infrared sensor may be activated for a predetermined period. If the near infrared sensor does not detect a particular gesture within the predetermined period, the near infrared sensor may be deactivate and the RGB sensor may be activated. If the RGB sensor detects the start of a particular hand movement corresponding to the gesture, the near infrared sensor may be reactivated to detect the gesture and the RGB sensor may be deactivated. If the RGB sensor does not detect a hand movement with a predetermined period, the RGB may be deactivated and the proximity sensor may be reactivated.

In other examples, different sensor activation and deactivation sequences may occur. For example, instead of the proximity sensor initially activating the near infrared sensor after detecting the presence of an object or hand, the RGB sensor may be initially activated instead. The near infrared sensor may be initially activated only after the RGB sensor detects the start of a particular hand movement corresponding to the gesture. In other instances, the near infrared sensor may be initially activated and the proximity sensor may be deactivated. If the near infrared sensor does not detect a particular gesture within the predetermined period, the near infrared sensor may be deactivate and the RGB sensor may be activated. If the RGB sensor then does not detect a hand movement with a predetermined period, the RGB may be deactivated and the proximity sensor may be initially activated. Other types of sensors and sensor activation and deactivation sequences may be used in different instances.

A sensor may be deactivated by reducing a power consumption of the sensor. In some instances, this may involve transitioning the sensor into a power savings state, reducing a user interaction detection capability of the sensor, or eliminating all power to the sensor. A sensor may be activated by providing the sensor with sufficient power to enable the sensor to perform a user interaction detection capability. In some instances, the amount of power provided to each activated sensor may vary depending on the type of sensor, the complexity of the user interaction to be measured, or the resolution or accuracy of the user interaction to be measured.

Sensor power consumption may be reduced by providing a predetermined sensor activation and deactivation sequence based on predetermined user interactions with one or more active sensors. In some instances, the sensor activation and deactivation sequence may specify a sequence for activating and deactivating sensors. These sensors may include different types of sensors capable of detecting and/or quantifying light, sound, touch, 3D image and other phenomena. The different types of sensors may include any type of user interaction sensor including, but are not limited to, proximity sensors, capacitive-touch sensors, microphone/audio sensors, red green blue (RGB) color sensors, near infrared sensors, and 3D sensors.

The activation and deactivation sequence may be selected to reduce or minimize a user impact of transitioning sensors to activated states. In this regard, the sequence may be selected to correspond to a logical sequence of natural or expected user interactions. This sequence of user behaviors in the form of user interactions may be used to select and switch between different power modes. For example, in order for a user to use a touch screen having a touch sensor, the user is expected to first position a finger, stylus, or other object on the touch screen. Thus, a proximity sensor may be used to detect the presence of the finger, stylus, or other object in the vicinity of the touch screen. Once the proximity sensor detects the presence of the object, it may activate the touch sensor so that the activation of the touch sensor will begin before the object actually comes into contact with the touch screen. This sequence may reduce, or even eliminate, a delay perceived by the user in activating the touch sensor. Additionally, because proximity sensors generally consume less power than touch sensors as discussed previously, power consumption may be reduced by turning off the touch sensor when the proximity sensor does not detect an object in the vicinity of the touch sensor.

Thus, a configuration for activating and deactivating passive user interface sensors may be determined by associating different power modes of each sensor with different user behaviors that are identified by one or more of the passive user interface sensors. In some instances, expected logical sequences of user interactions, such as expecting a user to move their hand towards a touch sensitive screen in order for their finger to physically touch the screen, may be used to identify a sequence, including any particular prerequisite conditions, for activating and/or deactivating one or more sensors.

FIG. 1 shows a block diagram of an exemplary computer system formed with a processor that includes execution units to execute an instruction in accordance with one embodiment of the present invention. System 100 includes a component, such as a processor 102 to employ execution units including logic to perform algorithms for process data, in accordance with the present invention, such as in the embodiment described herein. System 100 is representative of processing systems based on the PENTIUM® III, PENTIUM® 4, Xeon™, Itanium®, XScale™ and/or StrongARM™ microprocessors available from Intel Corporation of Santa Clara, Calif., although other systems (including PCs having other microprocessors, engineering workstations, set-top boxes and the like) may also be used. In one embodiment, sample system 100 may execute a version of the WINDOWS™ operating system available from Microsoft Corporation of Redmond, Wash., although other operating systems (UNIX and Linux for example), embedded software, and/or graphical user interfaces, may also be used. Thus, embodiments of the present invention are not limited to any specific combination of hardware circuitry and software.

Embodiments are not limited to computer systems. Alternative embodiments of the present invention can be used in other devices such as handheld devices and embedded applications. Some examples of handheld devices include cellular phones, Internet Protocol devices, digital cameras, personal digital assistants (PDAs), and handheld PCs. Embedded applications can include a micro controller, a digital signal processor (DSP), system on a chip, network computers (NetPC), set-top boxes, network hubs, wide area network (WAN) switches, or any other system that can perform one or more instructions in accordance with at least one embodiment.

FIG. 1 shows a block diagram of a computer system 100 formed with a processor 102 that includes one or more execution units 108 to perform an algorithm to perform at least one instruction in accordance with one embodiment of the present invention. One embodiment may be described in the context of a single processor desktop or server system, but alternative embodiments can be included in a multiprocessor system. System 100 is an example of a 'hub' system architecture. The computer system 100 includes a processor 102 to process data signals. The processor 102 can be a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. The processor 102 is coupled to a processor bus 110 that can transmit data signals between the processor 102 and other components in the system 100. The elements of system 100 perform their conventional functions that are well known to those familiar with the art.

In one embodiment, the processor 102 includes a Level 1 (L1) internal cache memory 104. Depending on the architecture, the processor 102 can have a single internal cache or multiple levels of internal cache. Alternatively, in another embodiment, the cache memory can reside external to the processor 102. Other embodiments can also include a combination of both internal and external caches depending on the particular implementation and needs. Register file 106 can store different types of data in various registers including integer registers, floating point registers, status registers, and instruction pointer register.

In an embodiment, the processor 102 may include a signal processing unit 105 or other signal processing functionality for analyzing input signals from one or more sensors 129. The signal processing unit 105 may apply feature extraction, pattern recognition, filtering or other functions to the input signal data from the sensors 129 in order to identify an occurrence of one or more predetermined user interactions.

Execution unit 108, including logic to perform integer and floating point operations, also resides in the processor 102. The processor 102 also includes a microcode (ucode) ROM that stores microcode for certain macroinstructions. For one embodiment, execution unit 108 includes logic to handle a packed instruction set 109. By including the packed instruction set 109 in the instruction set of a general-purpose processor 102, along with associated circuitry to execute the instructions, the operations used by many multimedia applications may be performed using packed data in a general-purpose processor 102. Thus, many multimedia applications can be accelerated and executed more efficiently by using the full width of a processor's data bus for performing operations on packed data. This can eliminate the need to transfer smaller units of data across the processor's data bus to perform one or more operations one data element at a time.

Alternate embodiments of an execution unit 108 can also be used in micro controllers, embedded processors, graphics devices, DSPs, and other types of logic circuits. System 100 includes a memory 120. Memory 120 can be a dynamic random access memory (DRAM) device, a static random access memory (SRAM) device, flash memory device, or other memory device. Memory 120 can store instructions and/or data represented by data signals that can be executed by the processor 102.

A system logic chip 116 is coupled to the processor bus 110 and memory 120. The system logic chip 116 in the illustrated embodiment is a memory controller hub (MCH). The processor 102 can communicate to the MCH 116 via a processor bus 110. The MCH 116 provides a high bandwidth memory path 118 to memory 120 for instruction and data storage and for storage of graphics commands, data and textures. The MCH 116 is to direct data signals between the processor 102, memory 120, and other components in the system 100 and to bridge the data signals between processor bus 110, memory 120, and system I/O 122. In some embodiments, the system logic chip 116 can provide a graphics port for coupling to a graphics controller 112. The MCH 116 is coupled to memory 120 through a memory interface 118. The graphics card 112 is coupled to the MCH 116 through an Accelerated Graphics Port (AGP) interconnect 114.

System 100 uses a proprietary hub interface bus 122 to couple the MCH 116 to the I/O controller hub (ICH) 130. The ICH 130 provides direct connections to some I/O devices via a local I/O bus. The local I/O bus is a high-speed I/O bus for connecting peripherals to the memory 120, chipset, and processor 102. Some examples are the audio controller, firmware hub (flash BIOS) 128, wireless transceiver 126, data storage 124, legacy I/O controller containing user input and keyboard interfaces, a serial expansion port such as Universal Serial Bus (USB), and a network controller 134. The data storage device 124 can comprise a hard disk drive, a floppy disk drive, a CD-ROM device, a flash memory device, or other mass storage device.

Each of the sensors 129 may also be connected to the ICH 130. The ICH 130 may be used for transmitting the input signals from each of the sensors 129 to the signal processing unit 105 for further analysis. The ICH 130 may also be used to transmit sensor activation and deactivation instructions to each of the sensors 129.

For another embodiment of a system, an instruction in accordance with one embodiment can be used with a system on a chip. One embodiment of a system on a chip comprises of a processor and a memory. The memory for one such system is a flash memory. The flash memory can be located on the same die as the processor and other system components. Additionally, other logic blocks such as a memory controller or graphics controller can also be located on a system on a chip.

Figure 2:
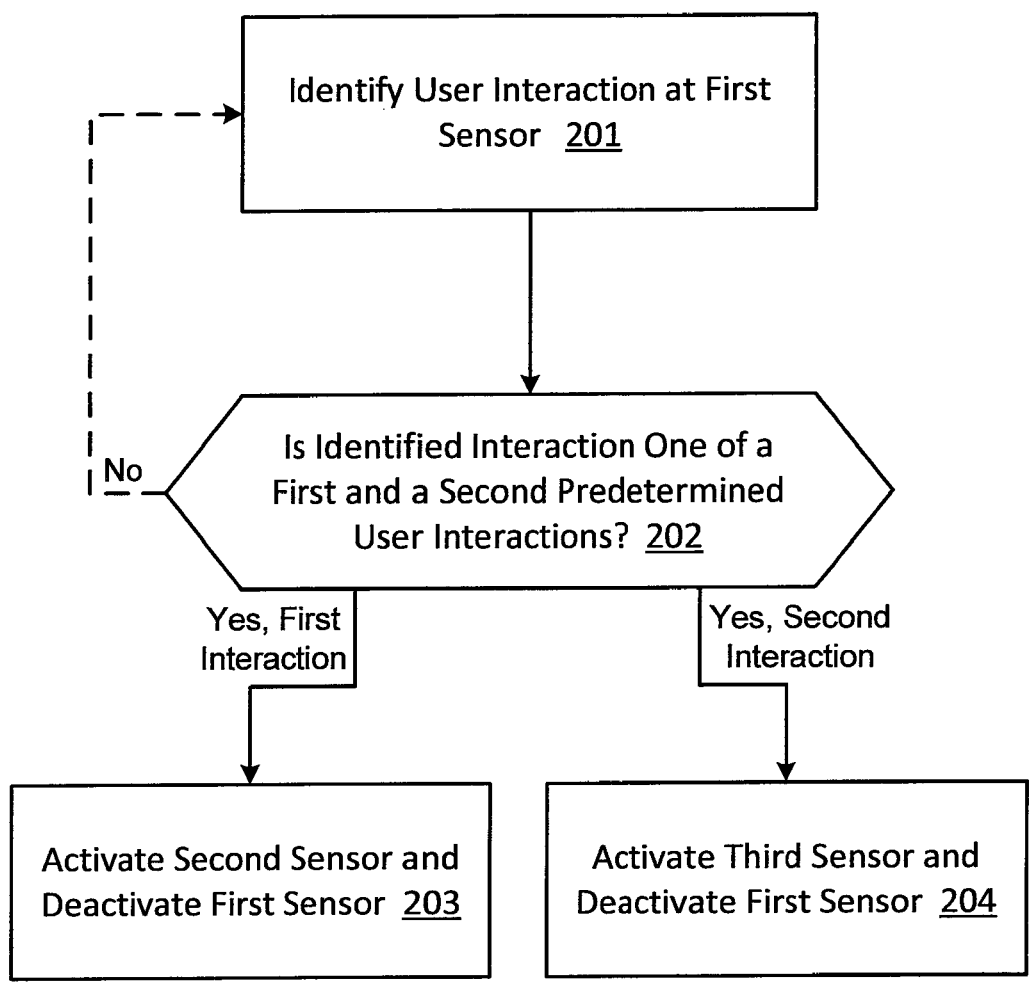
FIG. 2 shows an exemplary process in an embodiment of the invention.

FIG. 2 shows an exemplary process in an embodiment of the invention. In box 201, a user interaction may be identified from input signal data received from a first sensor of at least three sensors. A signal processing unit 105 may be used to identify one or more user interactions from the input signal data.

A user interaction may be any type of user behavior or environmental condition detectable by a respective sensor. For example, if a sensor is a 3D near infrared sensor capable of detecting particular gestures, then the user interaction may be a particular gesture, such as a particular movement of a hand, arm, or body. If the sensor is a light sensor, then the user interaction may be a particular amount of or change in ambient light. If the sensor is an audio sensor, then the user interaction may be a particular spoken word or sound, such as a specific chime. Other types of user interactions may be associated with different sensors so long as the user interaction may be identified from sensor signal data.

In box 202, a determination may be made as to whether the identified user interaction is one of at least two predetermined user interactions. The result of the determination may indicate that the identified user interaction corresponds to a first or a second of the at least two predetermined user interactions. In some instances the result of the determination may indicate that identified user interaction does not correspond to either the first or the second predetermined user interaction when such a condition is true.

Responsive to the determination in box 202 indicating that the identified user interaction corresponds to the first predetermined user interaction, in box 203 the second sensor may be activated and the first sensor may be deactivated. A sensor deactivation may include reducing a sensor power consumption and/or turning a sensor off. A sensor activation may include providing the sensor with sufficient operating power to perform a predetermined function and turning a sensor on.

Responsive to the determination in box 202 indicating that the identified user interaction corresponds to the second predetermined user interaction, in box 204 the third sensor may be activated and the first sensor may be deactivated.

In some instances, once the second sensor is activated in box 203, the signal data from the second sensor may be analyzed while the second sensor is active to identify a third predetermined user interaction at the second sensor. Once the third predetermined user interaction has been identified from the sensor data received from the second sensor, the first sensor may be reactivated and the second sensor may be deactivated.

In some instances, once the third sensor is activated in box 204, the signal data from the third sensor may be analyzed while the third sensor is active to identify a fourth predetermined user interaction at the third sensor. Once the fourth predetermined user interaction has been identified from the sensor data received from the third sensor, the first sensor may be reactivated and the third sensor may be deactivated.

In those instances where the result of the determination indicates that identified user interaction does not correspond to either the first or the second predetermined user interaction, the input signal data received from the first sensor may be continue to be analyzed in boxes 201 and 202 until a determination is made that an identified user interaction identified from the input signal data is one of a first and a second predetermined user interaction.

In some instance, the process shown in FIG. 2 may be initially started and/or the first sensor may be initially activated in response to an executed computing instruction calling for a use of the at least three sensors.

In some instances the process shown in FIG. 2 may be repeated once either the second or the third sensor has been activated in either of boxes 203 or 204. During the repeating of the process, a user interaction at the activated one of the second and third sensors may be identified. A determination may be made as to which of at least two predetermined user interactions the identified user interaction corresponds to. The activated second or third sensor may then be deactivated and another one of the sensors associated with the determined user interaction may be activated.

Figure 3:
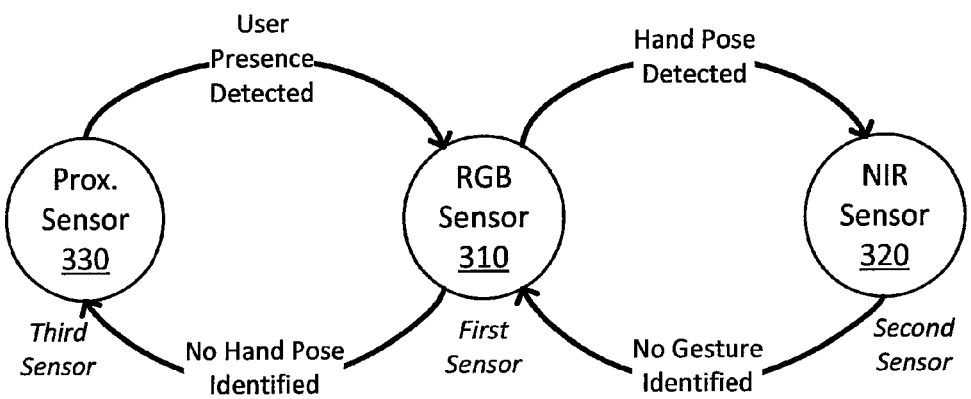
FIG. 3 shows an exemplary sensor activation and deactivation sequence in an exemplary three sensor embodiment of the invention.

FIG. 3 shows an exemplary sensor activation and deactivation sequence in an exemplary three sensor embodiment.

The three sensors may include a first red green blue (RGB) color sensor 310, a second near infrared sensor 320, and a third proximity sensor 330. The RGB sensor 310 may be a two dimensional sensor adapted to detect a object movement, such as a hand pose, in two dimensions. The near infrared sensor 320 may be a three dimensional sensor adapted to track a movement or gesture, such as a hand, arm, or body gesture, in three dimensions. The proximity sensor 330 may be adapted to detect a presence of an object within a particular range.

In an embodiment, the proximity sensor 330 may consume a lowest power of the three sensors 310, 320, 330 in an operating mode, the RGB color sensor 310 may consume a higher power than the proximity sensor 330 in the operating mode, and the near infrared sensor 320 may consume a highest power of the three sensors 310, 320, 330 in the operating mode.

A set of predetermined user interactions may be associated with each of the sensors 310, 320, 330. For example, a first predetermined user interaction associated with the RGB sensor 310 may be a particular hand pose identified within a predetermined time. A second predetermined user interaction associated with the RGB sensor 310 may be a non-identified interaction or non-interaction with the RGB sensor 310 and/or an interaction that is not the particular hand pose occurring throughout the predetermined time.

With these predetermined first and second predetermined user interactions, one of two events may occur at the RGB sensor 310. Either the particular hand pose is identified within the predetermined time and the first predetermined user interaction criteria may be satisfied, or the particular hand pose is not identified within the predetermined time in which case the second predetermined user interaction criteria may be satisfied.

In this example, the first predetermined user interaction may be associated with the second near infrared sensor 320, so that if the first predetermined user interaction is identified, the near infrared sensor 320 may be activated and the RGB sensor may be deactivated. The second predetermined user interaction may be associated with the third proximity sensor 330, so that if the second predetermined user interaction is identified, the proximity sensor 330 may be activated and the RGB sensor may be deactivated.

In this example, the second near infrared sensor 320 may have a third predetermined user interaction criteria associated with it. The third predetermined user interaction criteria may be that no recognized gesture is identified from the signal data of the near infrared sensor 320 with a predetermined time. If this third predetermined user interaction is identified while the near infrared sensor 320 is active, then the RGB sensor 310 may be reactivated and the near infrared sensor 320 may be deactivated.

In this example, the third proximity sensor 330 may have a fourth predetermined user interaction criteria associated with it. The fourth predetermined user interaction criteria may be that a user or object presence is detected. If this fourth predetermined user interaction is identified while the proximity sensor 330 is active, then the RGB sensor 310 may be reactivated and the proximity sensor 330 may be deactivated.

Figure 4:
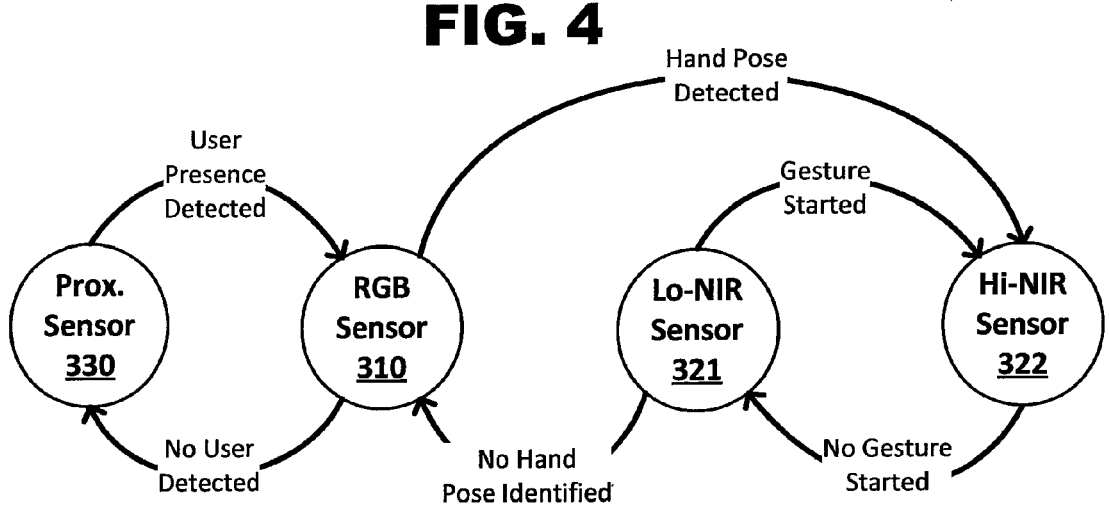
FIG. 4 shows an exemplary sensor activation and deactivation sequence in an exemplary four sensor embodiment of the invention.

FIG. 4 shows an exemplary sensor activation and deactivation sequence in an exemplary four sensor embodiment. The four sensors may include a proximity sensor 330, a red green blue (RGB) color sensor 310, a low-powered near infrared sensor 321, and a high-powered near infrared sensor 322. In some embodiments, the low-powered near infrared sensor 321, and the high-powered near infrared sensor 322 may be two different operating modes of a same sensor. In other embodiments, the low-powered near infrared sensor 321, and the high-powered near infrared sensor 322 may be two separate sensors.

The high-powered near infrared sensor 322 may have a higher detection resolution and provided with enhanced signal processing capabilities over the low-powered near infrared sensor 321 and may therefore consume more power when active than the low-power near infrared sensor 321.

A set of predetermined user interactions may be associated with each of the sensors 310, 321, 322, 330. For example, a first predetermined user interaction associated with the RGB sensor 310 may be a particular hand pose identified within a predetermined time. A second predetermined user interaction associated with the RGB sensor 310 may be a lack of an identified user, hand, or object presence occurring throughout the predetermined time.

With these predetermined first and second predetermined user interactions, one of three events may occur at the RGB sensor 310. First, the particular hand pose may be identified within the predetermined time and the first predetermined user interaction criteria may be satisfied. Second no identified user, hand, or object presence may occur throughout the predetermined time and the second predetermined user interaction criteria may be satisfied. Third, neither predetermined user interaction criteria may be satisfied and the RGB sensor 310 may continue to remain active until one of other two criteria are satisfied.

In this example, the first predetermined user interaction may be associated with the high-powered near infrared sensor 322, so that if the first predetermined user interaction is identified, the high-powered near infrared sensor 322 may be activated and the RGB sensor 310 may be deactivated. The second predetermined user interaction may be associated with the proximity sensor 330, so that if the second predetermined user interaction is identified, the proximity sensor 330 may be activated and the RGB sensor 310 may be deactivated.

In this example, the high-powered near infrared sensor 322 may have its own predetermined user interaction criteria associated with it. This predetermined user interaction criteria may be that no recognized gesture is identified as being started from the signal data of the high-powered near infrared sensor 322 within a predetermined time. If this predetermined user interaction is identified while the high-powered near infrared sensor 322 is active, then the low-powered near infrared sensor 321 may be activated and the high-powered near infrared sensor 322 may be deactivated.

The low-powered near infrared sensor 321 may have its own two predetermined user interaction criteria associated with it. The first criteria may be that a hand pose gesture movement is identified as beginning within a predetermined time. The second criteria may be that no hand pose movement is identified within the predetermined time. If the first criteria is satisfied, the high-powered near infrared sensor 322 may be reactivated and the low-powered near infrared sensor 321 may be deactivated. On the other hand, if the second criteria is satisfied, the RGB sensor 310 may be reactivated and the low-powered near infrared sensor 321 may be deactivated.

The third proximity sensor 330 may also have its own predetermined user interaction criteria associated with it. This predetermined user interaction criteria may be that a user or object presence is detected. If this fourth predetermined user interaction is identified while the proximity sensor 330 is active, then the RGB sensor 310 may be reactivated and the proximity sensor 330 may be deactivated.

Figure 5:
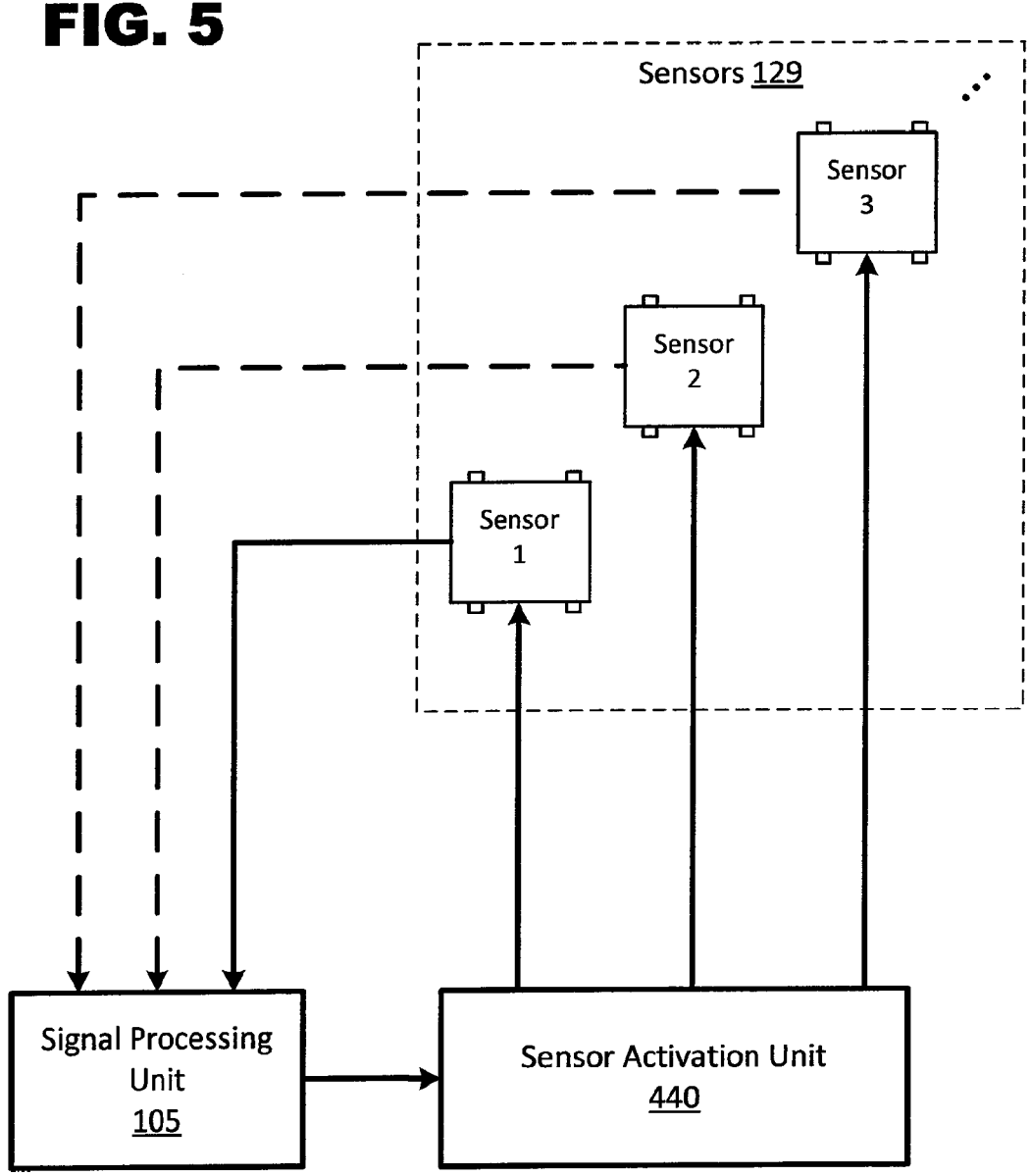
FIG. 5 shows an exemplary apparatus in an embodiment of the invention.

FIG. 5 shows an exemplary apparatus in an embodiment of the invention. An exemplary apparatus may include at least three passive user interface sensors 129. A signal processing unit 105 may be coupled to at least one of the sensors 129, though in some embodiments it may be coupled to more than one or even all of the sensors 129. The signal processing unit 105 may receive data signals from the first sensor, analyze the data signals, and identify one of a first and a second predetermined user interaction from the data signals at the first sensor.

A sensor activation unit 440 may be coupled to the signal processing unit 105 and a control input of each of the sensors 129. The sensor activation unit 440 may be configured to deactivate the first sensor and then either activate a second of the sensors 129 in response to signal processing unit 105 identifying the first predetermined user interaction from the data signals at the first sensor or activate a third of the sensors 129 in response to the signal processing unit 105 identifying the second predetermined user interaction from the data signals at the first sensor.

In some instances, the sensor activation unit 440 may be configured to initially activate the first sensor in response to an executed computer program instruction calling for a use of one or more of the sensors 129, such as a use of the at least three sensors 129. If the executed computer program instruction specifies a particular sensor that is to be used, the sensor activation unit 440 may also be configured to designated that particular sensor as the first sensor, and it may activate initially activate the first sensor. The signal processing unit 105 may then begin receiving data signals from the particular sensor once it has been activated by the sensor activation unit 440.

Figure 6:
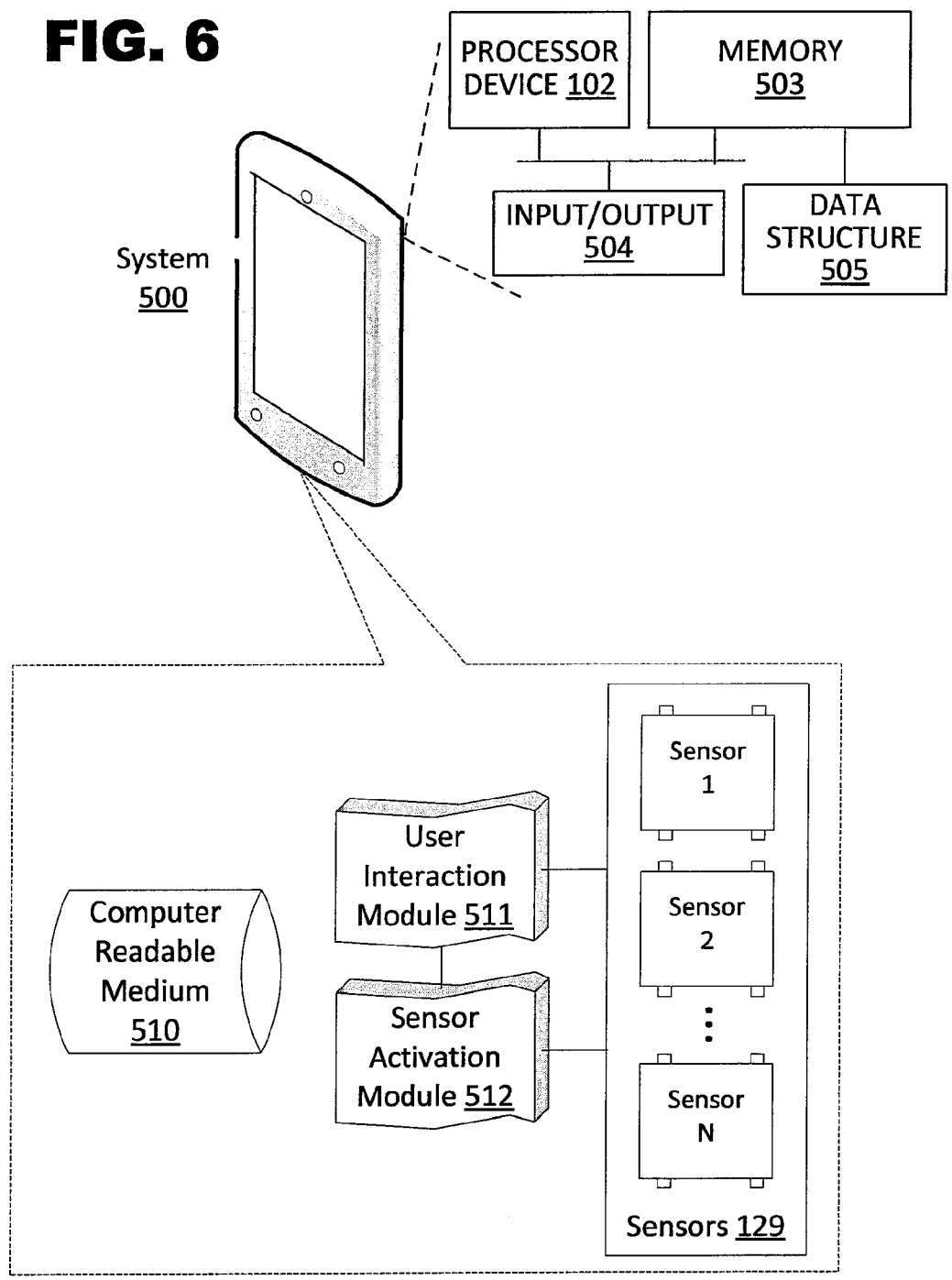
FIG. 6 shows an exemplary architecture of a system in an embodiment of the invention.

FIG. 6 shows an exemplary architecture of a system 500. System 500 may include a three or more passive user interface sensors 129, a memory 503, a computer readable medium 510, a user interaction module 511, a sensor activation module 512, and a processor 102. The user interaction module 511 and the sensor activation module 512 may include a combination of hardware and software. The software may be stored in the computer readable medium 510.

Memory 503 may store a set of instructions for executing a computer program providing for a use of the sensors 129. Memory 503 may contain different components for retrieving, presenting, changing, and saving data and may include the computer readable medium 510. Memory 503 may include a variety of memory devices, for example, Dynamic Random Access Memory (DRAM), Static RAM (SRAM), flash memory, cache memory, and other memory devices. Additionally, for example, memory 503 and processor device 102 may be distributed across several different computers that collectively comprise a system.

The user interaction identification module 511 may be capable of analyzing data signals from one or more of the sensors 129 and then identifying one of at least two predetermined user interactions from the analyzed data signals of a first of the sensors 129. The user interaction identification module 511 may use one or more signal processing algorithms to identify a predetermined user interaction from a data signal received from the first sensor. Once the user interaction identification module 511 identifies one of the predetermined user interactions from the data signal, the identified user interaction may be used by the sensor activation module 512.

The sensor activation module 512 may be configured to selectively activate and/or deactivate one or more of the sensors 129. In some instances, the sensor activation module 512 may be configured to deactivate the first of the sensors and then activate one of the other sensors 129 depending on the predetermined user interaction identified by the user interaction identification module 511. For example, the sensor activation module 512 may be configured to activate a second of the sensors 129 if a first predetermined user interaction is identified from the data signals at the first sensor and/or activate a third of the sensors 129 if a second predetermined user interaction is identified from the data signals at the first sensor.

The processor 102 may initiate activate the first of the sensors 129, the user interaction identification module 511, and the sensor activation module 512 after the processor 102 executes the set of stored instructions in the memory 503 providing for the use of the sensors 129.

The processor device 102, memory 503 storing loaded data or a loaded data structure 505, and a communications device 504 may be interconnected in the system 500 via a system bus. In various embodiments, system 300 may have an architecture with modular hardware and/or software systems that include additional and/or different systems communicating through one or more networks.

Communications device 504 may enable connectivity between the processor devices 502 in system 500 and those of other systems (not shown) by encoding data to be sent from the processor device 502 to another system and decoding data received from another system for the processor device 502.

Processor device 502 may perform computation and control functions of a system and comprises a suitable central processing unit (CPU). Processor device 502 may include a single integrated circuit, such as a microprocessing device, or may include any suitable number of integrated circuit devices and/or circuit boards working in cooperation to accomplish the functions of a processing device. Processor device 502 may execute computer programs, such as object-oriented computer programs, within memory 503 and/or computer readable medium 510.

The foregoing description has been presented for purposes of illustration and description. It is not exhaustive and does not limit embodiments of the invention to the precise forms disclosed. Modifications and variations are possible in light of the above teachings or may be acquired from the practicing embodiments consistent with the invention. For example, a coupling of one or components may refer to a direct coupling or an indirect coupling through one or more buses, networks, or other intermediaries. For example, in some instances the processor device 102 may be coupled directly to the sensors 129 though in other instances the processor device 102 may be coupled indirectly through one or more buses or other intermediary components.

We claim:

1. A method comprising:
   detecting a user interaction at a first passive user interface sensor of a computing system using a signal processing unit;
   identifying the detected user interaction as one of a plurality of predetermined user interactions;
   responsive to identifying the detected user interaction as a first of the plurality of predetermined user interactions, activating a second passive user interface sensor and deactivating the first sensor; and
   responsive to identifying the detected user interaction as a second of the plurality of predetermined user interactions, activating a third passive user interface sensor and deactivating the first sensor.

2. The method of claim 1, further comprising:
   identifying a third predetermined user interaction at the second sensor while the second sensor is activated; and
   responsive to the identifying of the third predetermined user interaction at the second sensor, reactivating the first sensor and deactivating the second sensor.

3. The method of claim 2, further comprising:
   identifying a fourth predetermined user interaction at the third sensor while the third sensor is activated; and
   responsive to the identifying of the fourth predetermined user interaction at the third sensor, reactivating the first sensor and deactivating the third sensor.

4. The method of claim 1 further comprising repeating the method of claim 1 to an extent of:
   identifying one of a plurality of predetermined user interactions at an activated one of the sensors; and
   responsive to the identifying of the one of the predetermined user interactions, deactivating the activated sensor and activating another of the sensors.

5. The method of claim 1, wherein:
   the first sensor is a two dimensional sensor adapted to detect a movement in two dimensions;
   the second sensor is a three dimensional sensor adapted to track a gesture in three dimensions; and
   the third sensor is a proximity sensor adapted to detect an object presence.

6. The method of claim 5, wherein:
   the first predetermined user interaction is a hand pose identified within a predetermined time; and
   the second predetermined user interaction is at least one of a non-interaction and a non-hand pose interaction throughout the predetermined time.

7. The method of claim 1, wherein a sensor deactivation includes reducing a power consumption of a sensor and a sensor activation includes providing the sensor with sufficient operating power.

8. The method of claim 7, wherein the sensor deactivation includes turning the sensor off and the sensor activation includes turning the sensor on.

9. The method of claim 1, wherein the at least three sensors include an audio sensor, a touch-sensitive sensor, and a light sensor.

10. The method of claim 1, wherein the at least three sensors include a near infrared sensor, a red green blue (RGB) color sensor, and a proximity sensor.

11. The method of claim 1, further comprising initially activating the first sensor responsive to an execution of an instruction calling for a use of the sensors.

12. A non-transitory computer readable medium comprising stored instructions that when executed by a processing device, cause the processing device to:
   detect a user interaction at a first passive user interface sensor of a computing system;
   identify the detected user interaction as one of a first and a second predetermined user interaction;
   responsive to identifying the detected user interaction as the first predetermined user interaction, activate a second passive user interface sensor and deactivate the first sensor; and
   responsive to identifying the detected user interaction as the second predetermined user interaction, activate a third passive user interface sensor and deactivate the first sensor.

13. A non-transitory computer readable medium of claim 12, wherein the sensors include a lowest power consuming proximity sensor, a higher power consuming two-dimensional object sensor, and a highest power consuming three-dimensional object sensor.

14. A non-transitory computer readable medium of claim 13, wherein the first sensor is a the higher power consuming two-dimensional object sensor adapted to track an object movement in two dimensions, the second sensor is the highest power consuming three-dimensional object sensor adapted to power track an object movement in three dimensions, and the third sensor is the lowest power consuming proximity sensor adapted to detect an object presence.

15. A non-transitory computer readable medium of claim 14, wherein the first predetermined user interaction is a predetermined object movement in two dimensions identified within a predetermined time and the second predetermined user interaction is not the first predetermined user interaction.

16. An apparatus comprising:
   at least three passive user interface sensors;
   a signal processing unit coupled to a first sensor of the at least three passive user interface sensors to detect a user interaction at a first sensor of the at least three sensors and to identify the detected user interaction as one of a first and a second predetermined user interaction; and
   a sensor activation unit to:
      deactivate the first sensor and activate a second sensor of the detected user interaction as the at least three passive user interface sensors responsive to the identification of the first predetermined user interaction, and
      deactivate the first sensor and activate a third sensor responsive to the identification of the detected user interaction as the second predetermined user interaction.

17. The apparatus of claim 16, wherein the sensor activation unit initially activates the first sensor in response to an execution of a computer program instruction calling for a use of at least one sensor.

18. The apparatus of claim 16, wherein the sensor activation unit initially activates the first sensor in response to an execution of a computer program instruction calling for a use of the at least three sensors.

19. The apparatus of claim 16, wherein responsive to an execution of a computer program instruction calling for an initial use of one of the at least sensors, the sensor activation designates the one sensor called for the initial use as the first sensor and activates the designated first sensor.

20. A computing system comprising:
   at least three passive user interface sensors;
   a memory storing a set of instructions to execute a computer program providing a use of the at least three passive user interface sensors;
   a user interaction identification module to detect a user interaction at a first sensor of the at least three sensors and to identify the detected user interaction as one of a first and a second predetermined user interaction; and
   a sensor activation module to deactivate the first sensor, activate a second of the at least three sensors responsive to a respective identification of the detected user interaction as the first predetermined user interaction at the user interaction identification module, and activate a third of the at least three sensors responsive to a respective identification of the detected user interaction as the second predetermined user interaction at the user interaction identification module; and
   a processor for initially activating the first sensor, the user interaction identification module and the sensor activation module after executing the set of stored instructions providing the use of the at least three passive user interface sensors.

21. The computing system of claim 20, wherein the at least three sensors include a lowest power consuming proximity sensor, a higher power consuming a red green blue (RGB) color sensor, and a highest power consuming near infrared sensor.

22. The computing system of claim 21, wherein the first sensor is the higher power consuming red green blue (RGB)

color sensor adapted to track an object movement in two dimensions, the second sensor is the highest power consuming near infrared sensor adapted to power track an object movement in three dimensions, and the third sensor is the lowest power consuming proximity sensor adapted to detect an object presence.

* * * * *